(12) United States Patent
Pappas et al.

(10) Patent No.: US 8,229,841 B2
(45) Date of Patent: Jul. 24, 2012

(54) METHOD AND SYSTEM FOR RESERVING FUTURE PURCHASES OF GOODS AND SERVICES

(75) Inventors: Christian S. Pappas, Chicago, IL (US); Charles P. Brown, Chicago, IL (US)

(73) Assignee: Smart Options, LLC, Chicago, IL (US)

( * ) Notice: Subject to any disclaimer, the term of this patent is extended or adjusted under 35 U.S.C. 154(b) by 0 days.

(21) Appl. No.: 13/251,826

(22) Filed: Oct. 3, 2011

(65) Prior Publication Data
US 2012/0078698 A1 Mar. 29, 2012

Related U.S. Application Data

(60) Continuation of application No. 12/970,165, filed on Dec. 10, 2010, now Pat. No. 8,032,447, which is a continuation of application No. 11/805,564, filed on May 23, 2007, now Pat. No. 7,865,424, which is a division of application No. 09/566,671, filed on May 8, 2000, now Pat. No. 7,313,539.

(51) Int. Cl.
*G06Q 40/00* (2012.01)

(52) U.S. Cl. ................ 705/37; 705/14.26; 705/26

(58) Field of Classification Search ............ 705/35–45
See application file for complete search history.

(56) References Cited

U.S. PATENT DOCUMENTS

| | | | |
|---|---|---|---|
| 4,823,265 A | 4/1989 | Nelson | |
| 4,903,201 A | 2/1990 | Wagner | |
| 5,237,499 A | 8/1993 | Garback | |
| 5,297,031 A | 3/1994 | Gutterman | |
| 5,590,197 A | 12/1996 | Chen | |
| 5,671,363 A | 9/1997 | Cristofich | |
| 5,732,398 A | 3/1998 | Tag awe | |
| 5,732,400 A * | 3/1998 | Mandler et al. | 705/26.44 |
| 5,778,357 A | 7/1998 | Kolton | |
| 5,794,207 A | 8/1998 | Walker | |

(Continued)

FOREIGN PATENT DOCUMENTS
WO WO9926173 * 5/1999

OTHER PUBLICATIONS

Estache, Antonio and Alexander, Ian, Infrastructure Restructuring and Regulation: Building a Base for Sustainable Growth (Sep. 1999). World Bank Policy Research Working Paper No. 2415.*

(Continued)

*Primary Examiner* — Robert Niquette
(74) *Attorney, Agent, or Firm* — Lesavich High-Tech Law Group, P.C.; Stephen Lesavich (57) ABSTRACT

A method and system for reserving future purchases of goods or services or events including plural electronic options with associated option fees for the goods or services or events. The plural electronic options include electronic option terms established by one or more suppliers who can supply the goods or services or events. The purchase of the electronic option is accepted according to electronic option terms established by the desired supplier. The option terms may vary greatly among the individual suppliers and no two suppliers may use the same option terms. Demographic information is collected from purchasers of electronic options and used to allow other suppliers of goods or services or events to target such purchasers. Various fees are generated for display, purchase, exercise or non-exercise of electronic options.

8 Claims, 7 Drawing Sheets

U.S. PATENT DOCUMENTS

| | | | |
|---|---|---|---|
| 5,797,127 | A | 8/1998 | Walker |
| 5,855,007 | A | 12/1998 | Jovicic |
| 5,884,277 | A | 3/1999 | Khos la |
| 5,884,286 | A | 3/1999 | Daughtery, III |
| 5,897,620 | A | 4/1999 | Walker |
| 5,905,246 | A | 5/1999 | Fajkowski |
| 5,948,040 | A | 9/1999 | DeLorme |
| 5,991,744 | A | 11/1999 | DiCresce |
| 6,012,045 | A | 1/2000 | Barzilal |
| 6,016,483 | A | 1/2000 | Rickard |
| 6,024,641 | A | 2/2000 | Samo |
| 6,035,289 | A | 3/2000 | Chou |
| 6,041,308 | A | 3/2000 | Walker |
| 6,049,778 | A | 4/2000 | Walker |
| 6,049,783 | A | 4/2000 | Segal |
| 6,094,681 | A | 7/2000 | Shaffer |
| 6,173,270 | B1 | 1/2001 | Cristofich |
| 6,175,922 | B1 | 1/2001 | Wang |
| 6,263,321 | B1 | 7/2001 | Daughtery, III |
| 6,272,532 | B1 | 8/2001 | Feinleib |
| 6,318,536 | B1 | 11/2001 | Korman |
| 6,336,098 | B1 | 1/2002 | Fortenberry |
| 6,370,514 | B1 * | 4/2002 | Messner .................... 705/14.26 |
| 6,381,582 | B1 | 4/2002 | Walker |
| 6,390,472 | B1 | 5/2002 | Vinarsky |
| 6,393,269 | B1 | 5/2002 | Hartmeier |
| 6,507,823 | B1 | 1/2003 | Nel |
| 6,556,976 | B1 | 4/2003 | Callen |
| 6,618,707 | B1 | 9/2003 | Gary |
| 6,704,713 | B1 | 3/2004 | Brett |
| 6,732,922 | B2 | 5/2004 | Lindgren |
| 6,736,322 | B2 | 5/2004 | Gobburu |
| 6,920,428 | B2 | 7/2005 | Greene |
| 6,971,001 | B1 | 11/2005 | Rolfs |
| 7,127,408 | B2 | 10/2006 | Rosen |
| 7,206,755 | B1 | 4/2007 | Muralidhar |
| 7,231,656 | B1 | 6/2007 | Nathan |
| 7,257,552 | B1 | 8/2007 | Franco |
| 7,313,539 | B1 | 12/2007 | Pappas |
| 7,318,098 | B2 | 1/2008 | Steinberg |
| 7,363,267 | B1 | 4/2008 | Vincent et al. |
| 7,392,226 | B1 | 6/2008 | Sasaki et al. |
| 7,552,393 | B2 | 6/2009 | Hayes-Roth |
| 7,571,124 | B2 | 8/2009 | Bodin |
| 7,610,220 | B2 | 10/2009 | Cella et al. |
| 7,610,221 | B2 | 10/2009 | Cella et al. |
| 7,660,751 | B2 | 2/2010 | Cella et al. |
| 7,660,752 | B2 | 2/2010 | Cella et al. |
| 7,752,116 | B2 * | 7/2010 | Ascher et al. .................. 705/37 |
| 7,865,424 | B2 | 1/2011 | Pappas et al. |
| 7,962,375 | B2 | 6/2011 | Pappas et al. |
| 7,996,292 | B2 | 8/2011 | Pappas et al. |
| 8,032,447 | B2 | 10/2011 | Pappas et al. |
| 2001/0032165 | A1 | 10/2001 | Friend |
| 2002/0026403 | A1 | 2/2002 | Tambay |
| 2002/0046137 | A1 | 4/2002 | Odom |
| 2002/0069150 | A1 | 6/2002 | Ni |
| 2002/0183448 | A1 | 12/2002 | Tib bin |
| 2002/0185414 | A1 | 12/2002 | Morii |
| 2003/0009068 | A1 | 1/2003 | Platz |
| 2003/0061110 | A1 | 3/2003 | Bodin |
| 2003/0147789 | A1 | 8/2003 | Adachi |
| 2003/0159889 | A1 | 8/2003 | Johnson |
| 2003/0170453 | A1 | 9/2003 | Foss |
| 2003/0183694 | A1 | 10/2003 | Sayers |
| 2003/0199596 | A1 | 10/2003 | Koike |
| 2003/0204449 | A1 | 10/2003 | Kotas |
| 2003/0208406 | A1 | 11/2003 | Okamoto |
| 2003/0221438 | A1 | 12/2003 | Rane |
| 2003/0226552 | A1 | 12/2003 | Hewkin |
| 2003/0230529 | A1 | 12/2003 | Austin |
| 2004/0000517 | A1 | 1/2004 | Austin |
| 2004/0030616 | A1 | 2/2004 | Florance |
| 2004/0072609 | A1 | 4/2004 | Ungaro |
| 2004/0088242 | A1 | 5/2004 | Ascher |
| 2004/0093225 | A1 | 5/2004 | Bedner |
| 2004/0114960 | A1 | 6/2004 | Kunou |
| 2004/0254818 | A1 | 12/2004 | Rosen |
| 2005/0002741 | A1 | 1/2005 | Brensinger |
| 2005/0039816 | A1 | 2/2005 | Maguire |
| 2005/0051919 | A1 | 3/2005 | Koike |
| 2005/0080520 | A1 | 4/2005 | Kline |
| 2005/0120715 | A1 | 6/2005 | Labrador |
| 2005/0133466 | A1 | 6/2005 | Bridges |
| 2005/0170115 | A1 | 8/2005 | Tibbitt |
| 2005/0202865 | A1 | 9/2005 | Kim |
| 2005/0205491 | A1 | 9/2005 | Helm |
| 2005/0246225 | A1 | 11/2005 | Jorgensen |
| 2005/0263633 | A1 | 12/2005 | Vantrease |
| 2005/0268946 | A1 | 12/2005 | Miles |
| 2006/0053030 | A1 | 3/2006 | Nakamura |
| 2006/0059038 | A1 | 3/2006 | Iuchi |
| 2006/0064573 | A1 | 3/2006 | Rolfs |
| 2006/0064574 | A1 | 3/2006 | Rolfs |
| 2006/0065610 | A1 | 3/2006 | Giralico |
| 2006/0080819 | A1 | 4/2006 | McAllister |
| 2006/0117625 | A1 | 6/2006 | Peterson |
| 2006/0118469 | A1 | 6/2006 | Bork |
| 2006/0178545 | A1 | 8/2006 | Yang |
| 2006/0180518 | A1 | 8/2006 | Kashikura |
| 2006/0271462 | A1 | 11/2006 | Harmon |
| 2006/0277130 | A1 | 12/2006 | Harmon |
| 2007/0066397 | A1 | 3/2007 | Nammi et al. |
| 2007/0178570 | A1 | 8/2007 | Dlz |
| 2007/0232982 | A1 | 10/2007 | Jarmon |
| 2007/0291491 | A1 | 12/2007 | Li |
| 2008/0021810 | A1 | 1/2008 | Pappas |
| 2008/0091557 | A1 | 4/2008 | Cella |
| 2008/0091558 | A1 | 4/2008 | Cella |
| 2008/0091559 | A1 | 4/2008 | Cella |
| 2008/0091560 | A1 | 4/2008 | Cella |
| 2008/0091561 | A1 | 4/2008 | Cella |
| 2008/0091562 | A1 | 4/2008 | Cella |
| 2008/0091563 | A1 | 4/2008 | Cella |
| 2008/0091564 | A1 | 4/2008 | Cella |
| 2008/0091565 | A1 | 4/2008 | Cella |
| 2008/0091566 | A1 | 4/2008 | Cella |
| 2008/0091567 | A1 | 4/2008 | Cella |
| 2008/0091568 | A1 | 4/2008 | Cella |
| 2008/0091569 | A1 | 4/2008 | Cella |
| 2008/0091570 | A1 | 4/2008 | Cella |
| 2008/0097040 | A1 | 4/2008 | Brown |
| 2008/0097868 | A1 | 4/2008 | Cella |
| 2008/0097869 | A1 | 4/2008 | Cella |
| 2008/0097870 | A1 | 4/2008 | Cella |
| 2008/0103921 | A1 | 5/2008 | Cella |
| 2008/0103922 | A1 | 5/2008 | Cella |
| 2008/0103924 | A1 | 5/2008 | Cella |
| 2008/0103925 | A1 | 5/2008 | Cella |
| 2008/0103926 | A1 | 5/2008 | Cella |
| 2008/0103927 | A1 | 5/2008 | Cella |
| 2008/0103928 | A1 | 5/2008 | Cella |
| 2008/0103929 | A1 | 5/2008 | Cella |
| 2008/0103930 | A1 | 5/2008 | Cella |
| 2008/0103931 | A1 | 5/2008 | Cella |
| 2008/0103932 | A1 | 5/2008 | Cella |
| 2008/0103933 | A1 | 5/2008 | Cella |
| 2008/0109325 | A1 | 5/2008 | Cella |
| 2008/0215457 | A1 | 9/2008 | Pappas |
| 2008/0215495 | A1 | 9/2008 | Pappas |
| 2009/0036192 | A1 | 2/2009 | Hughs |

OTHER PUBLICATIONS

Partial PCT Search Report PCT/US2008/079,273 Dated: Dec. 8, 2008.

Partial PCT Search Report PCT/US2008/079,275 Dated: Dec. 24, 2008.

* cited by examiner

METHOD AND SYSTEM FOR RESERVING FUTURE PURCHASES OF GOODS AND SERVICES

CROSS REFERENCES TO RELATED APPLICATIONS

This U.S. Application is a Continuation of U.S. patent application Ser. No. 12/970,165, filed on Dec. 10, 2010, that issued as U.S. Pat. No. 8,032,447 on Oct. 4, 2011, which is a Continuation of U.S. patent Ser. No. 11/805,564, filed May 23, 2007, that issued as U.S. Pat. No. 7,865,424, on Jan. 4, 2011, which is a Divisional of U.S. application Ser. No. 09/566,671 filed on May 8, 2000, that issued as U.S. Pat. No. 7,313,539, on Dec. 25, 2007, the contents of all which are incorporated by reference.

FIELD OF THE INVENTION

This invention relates to providing goods or services over a computer network. More specifically, this invention relates to providing electronic options for goods or services via a computer network such as the Internet or an intranet.

BACKGROUND OF THE INVENTION

The Internet has provided consumers a medium for shopping that is available twenty-four hours a day, seven days a week and 365 days a year. The Internet has also provided suppliers that ability to offer goods or services and receive orders from consumer in an automated, and potentially more cost-effective way.

There are many occasions for which a consumer may be interested in goods or services but not be able or willing to purchase the goods or services at the present time. For example, a supplier may be offering a new electronic component that may interest a consumer. The consumer may not presently have the money to purchase the new electronic component. However, the consumer may want to lock in a current favorable price or guaranty the availability of the electronic component. The consumer may also want to "lock-in" a desired price while he/she does comparison shopping on the electronic component at other locations.

As is known in the art, an option can be used to reserve a proprietary interest in an item at a future time. An option is typically a contract conveying a right to buy or sell a designated item at a specified time during a stipulated period. There are many examples of using options for financial instruments, such as stocks, bonds and other items known in the art. See for example, U.S. Pat. No. 6,049,783, entitled "Interactive Internet Analysis Method," U.S. Pat. No. 6,024,641, entitled "Method apparatus and system for lottery gaming," and U.S. Pat. No. 5,991,744, entitled "Method and apparatus that process financial data relating to wealth accumulations plans" U.S. Pat. No. 5,844,286, entitled "Apparatus and process for executing an expirationless option transaction," U.S. Pat. No. 5,671,363, entitled "Private stock option account control and exercise system," and others.

There are also examples of making conditional purchases known in the art. See for example, U.S. Pat. No. 6,041,308, entitled "System and method for motivating submission of conditional purchase offers," U.S. Pat. No. 6,012,045, entitled "Computer-based electronic bid auction and sale system," U.S. Pat. No. 5,897,620, entitled "Method and apparatus for the sale of airline-specified flight tickets," U.S. Pat. No. 5,297,031, entitled "Method and apparatus for order management by market brokers" and others.

However, there are several problems associated with using options known in the art to reserve a proprietary interest in a product at a future time. One problem is that unlike securities products (e.g., stocks, bonds, etc.) which are limited in number, there are far too many types of diverse products available on the Internet to logistically and effectively create one set of mutually agreeable contract terms for options to be used for such products.

Another problem is that options typically are created to protect a high-value, high-volume, high-risk products against price volatility. Price volatility is generally not large enough for most consumer or business products to use options. Without large price volatility, there is typically no incentive for a supplier to supply options for low volume, low margin, or low risk products.

Another problem is that options typically have uniform terms set by a central governing agency (e.g., the Security Exchange Commission). Such uniform terms are typically not suitable for an individual supplier of a product. A supplier may desire to provide his/her own option terms for specific products to help manage his/her inventory, risk or revenue.

Another problem is that the Internet and other computer networks have generic, everyday, consumer or business products available to consumers worldwide. However, options have typically not been available on such products.

Another problem is that suppliers may want to sell options on products that are not fully developed or don't even exist yet. Presently, option systems do not allow an option to be purchased for a product that does not exist or may never exist.

Another problem is that the Internet and other computer networks have provided the ability for suppliers to use new e-commerce business models to supply products. Options typically have not been used to support new e-commerce business models.

Another problem is that options typically have been used only for goods and not for services. A consumer may desire to purchase an option for a type of service (e.g., accounting services, a musical performer's services, an actor's services, etc.).

Thus, it is desirable to provide a method for using options for goods or services that is available on a computer network, such as the Internet. The method should make it easy and convenient for a purchaser to buy an option on goods or services to reserve a right to purchase desired goods or services with option terms set by a supplier of the goods or services.

SUMMARY OF THE INVENTION

In accordance with preferred embodiments of the present invention, some of the problems associated with using options for goods or services are overcome. A method and system for reserving future purchases of goods or services is presented.

A method for providing electronic options. A server network device provides to a client network device via a computer network, a list of available goods or services including plural electronic options with associated option fees for the goods or services. The plural electronic options include electronic option terms established by one or more suppliers who can supply the goods or services. An option fee is associated with a reservation price to purchase desired goods or services at a desired future time. Electronic option terms for a selected good or service from a desired supplier who can supply the selected good or service are provided. A purchase of an electronic option for an option fee for a desired good or service from a desired supplier is accepted on the server network device. The purchase of the electronic option is accepted according to electronic option terms established by the desired supplier. Demographic information is collected from purchasers of electronic options and used to allow other suppliers of goods or services or events to target such purchasers. Various fees are generated for display, purchase, exercise or non-exercise of electronic options.

A type of electronic option provided is governed by the option terms established by an individual supplier. The option terms may vary greatly among the individual suppliers and no two suppliers may want to use the same option terms. Use of variable option terms may provide significant flexibility for use of the electronic options by suppliers. Use of the electronic options is governed by individual suppliers and not by a government authority or security laws.

The method and system may be used for business-to-business ("b2b"), business-to-consumer ("b2c"), consumer-to-business ("c2b"), consumer-to-consumer, ("c2c") or other types of electronic transactions. The electronic options allows a purchaser to risk a small amount of money to use an electronic option to reserve a price to purchase desired goods or services at a desired future time.

The foregoing and other features and advantages of a preferred embodiment of the present invention will be more readily apparent from the following detailed description. The detail description proceeds with references to accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Electronic Option System

Figure 1:
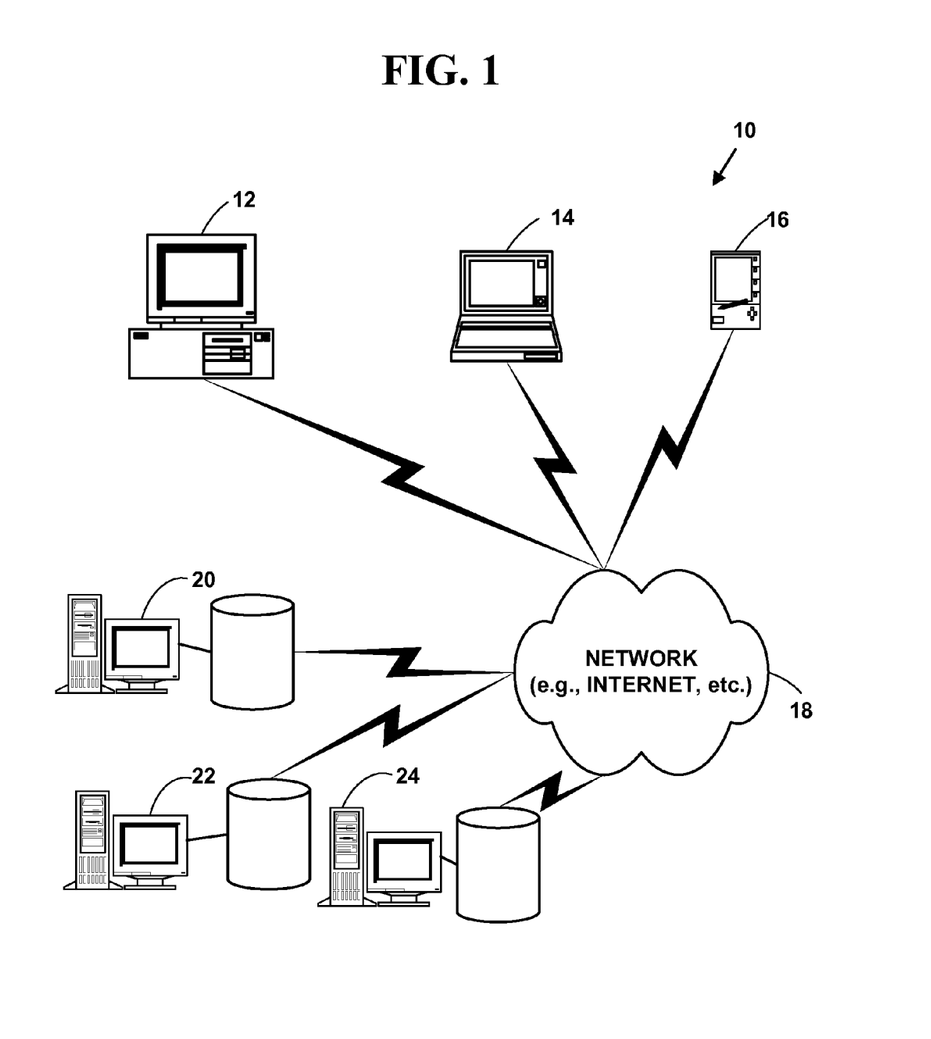
FIG. 1 is a block diagram illustrating an exemplary electronic option system.

FIG. 1 is a block diagram illustrating an exemplary electronic option system 10 for one exemplary embodiment of the present invention. The electronic option system 10 includes one or more client network devices 12, 14, 16 (only three of which are illustrated). The client network devices 12, 14, 16 include, but are limited to, personal computers, wireless telephones, personal information devices, personal digital assistants, hand-held devices, network appliances, and other types of electronic devices. However, the present invention is not limited to these devices and more, fewer or equivalent types of client electronic devices can also be used. The client network devices 12, 14, 16 are in communications with a computer network 18 (e.g., the Internet, intranet, etc.). The communication includes, but is not limited to, communications over a wire connected to the client network devices, wireless communications, and other types of communications. Plural server network devices 20, 22, 24 associated with one or more associated databases include electronic option and/or pricing information for goods and services that may be supplied by plural suppliers.

An operating environment for components of the electronic option system 10 for preferred embodiments of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Figure 2:
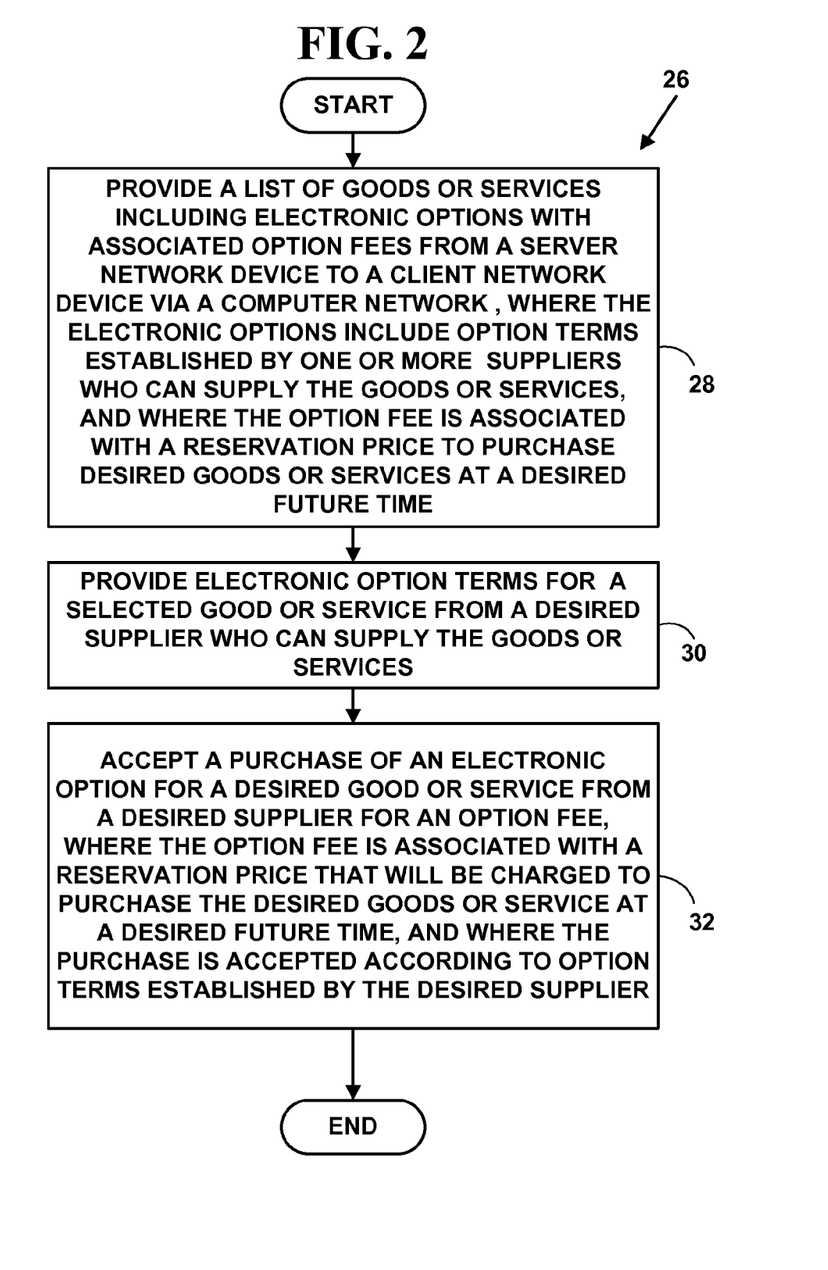
FIG. 2 is a flow diagram illustrating a method for providing electronic options for goods and services from a server network device.

Providing Electronic Options for Goods and Services From a Server Network Device FIG. 2 is a flow diagram illustrating a Method 26 for providing electronic options for goods and services. At Step 28, a server network device provides to a client network device via a computer network, a list of available goods or services including plural electronic options with associated option fees for the goods or services. The plural electronic options include electronic option terms established by one or more suppliers who can supply the goods or services. An option fee is associated with a reservation price to purchase desired goods or services at a desired future. At Step 30, electronic option terms for a selected good or service for a desired supplier who can supply the selected good or service are provided. At Step 32, a purchase of an electronic option for an option fee for a desired good or service for a desired supplier is accepted on the server network device. The purchase of the electronic option is accepted according to electronic option terms established by the desired supplier. A confirmation for purchase of the electronic option for the option fee is provided to the client network device. Information about the electronic option is stored in a database associated with the server network device.

A type of electronic option used with Method 26 is governed by the option terms established by an individual supplier. The option terms may vary greatly among the individual suppliers and no two suppliers may want to use the same option terms. Use of variable option terms provides significant flexibility for use of the electronic options with Method 26.

Method 26 and a computer network 18 such as the Internet allows a supplier to supply options for virtually any good or service based on his/her own terms. The electronic options may be used for low price, low volume, low margin, or low risk products. The goods may include virtually any consumer or business products (e.g., toys, electronic devices, etc.). The services may include virtually any services (e.g., accounting services, a musical performer's services, an actor's services, etc.).

In one embodiment of the present invention, the list of goods and services with plural electronic options provided at Step 28 includes a "counter" that includes a number of available options for a desired goods or services. In such an embodiment, the counter may count down to zero in real-time as electronic options are purchased.

In one embodiment of the present invention, a supplier may desire to desire to provide an electronic option only on desired products, but not all products. The electronic options can be used to better manage inventory, risk or revenues.

In one embodiment of the present invention, a supplier is a "vendor." In such an embodiment, a vendor allows electronic options to be purchased for goods or services the vendor creates, manufactures, etc. In another embodiment of the present invention, a supplier is a "broker." In such an embodiment, a broker obtains desired goods or services from one or more other vendors, but does not create the desired goods or services. In another embodiment of the present invention, a supplier is both a vendor and a broker depending on the goods or services offered. In such an embodiment, the supplier will act as a vendor for a first portion of goods or services provided and also act as a broker for a second portion of goods or services provided. For example, a supplier may act as a vendor to sell it's own goods, but may also act as a broker for other goods from other suppliers.

In one embodiment of the present invention, the list of plural electronic options with associated option fees is provided from one central location on a computer network. In another embodiment of the present invention, the list of plural electronic options with associated option fees is provided from multiple distributed locations on a computer network.

When an electronic option is purchased, a purchaser is sent periodic reminders about the electronic options until the electronic option expires at the desired future time. The periodic reminders can be sent electronically, such as with electronic mail, ("e-mail") or sent in other electronic or non-electronic formats (e.g., a post card in regular mail).

A list of purchase prices for the goods or services is typically provided along with the list of electronic options. This allows a purchaser to either directly purchase desired goods or services or potentially defer a purchase to a desired time in the future by purchasing an electronic option on desired goods or services.

In another embodiment of the present invention, electronic options may be made available other suppliers who supply similar goods or services. A fee will typically be charged to a supplier who may request a list of purchasers of electronic options. In such an embodiment, the electronic options may be made available only if the purchaser gives his/her permission.

In another embodiment of the present invention, the electronic options may be made available to other suppliers based on the electronic option terms set by a supplier. Making the electronic options available to other suppliers allows the other suppliers to send additional offers for similar goods or services directly to a purchaser of an electronic option. The additional offers may include similar goods or services or goods or services with additional or enhanced features or functionality. The offers may also include sale items that may be purchased instead of the desired goods or services reserved with the electronic option.

In one embodiment of the present invention, a purchaser is allowed to exercise the electronic option at any time before the desired future time to purchase the desired goods or services at the reservation price. In another embodiment of the present invention, the purchaser is only allowed to exercise the option when the desired future time arrives.

In one embodiment of the present invention, a supplier may sell electronic options on goods or services that are not fully developed or don't even exist yet. Purchasing interest in such electronic options could be used to determine the economic feasibility of continuing to develop such a product or used to determine final pricing and features for a desired good or service. In another embodiment of the present invention, a supplier may use electronic options to support new e-business models.

In another embodiment of the present invention, an electronic option can purchased for an event that may never happen. For example, an option service may provide electronic options for World Series tickets for all major league baseball teams before the season starts. Only two teams will play in the World Series. However, a purchaser is able to purchase an option to buy World Series tickets for any team, even those that team may not play in the World Series.

In another embodiment of the present invention, the option terms established by a supplier may indicate purchasing an electronic option with a lower option fee will only guarantee a purchaser an X % (e.g., 50%) chance that the desired goods or services will be available at all at the desired future time. The option terms may also indicate that purchasing an electronic option with a higher option fee will guarantee a purchaser a Y % (e.g., 99%) chance that the desired goods or services will be available at the desired future time. In such an embodiment, paying an option fee does not guarantee that desired goods or services will be available for a purchaser.

In another embodiment of the present invention, the electronic option may include a volatility factor and a range of reservation prices. The volatility factor may cause an actual price paid for desired goods or services at a desired future time to be greater than the reservation price reserved by a purchaser. For example, an electronic option with a volatility factor may be made available for goods or services including a new toy, a new electronic product, tickets for sporting events, concerts, etc. The electronic option may include a volatility factor since the demand for the goods or services is uncertain, but demand may eventually exceed supply based on a scenario of conditions.

If an electronic option with a volatility factor is purchased for goods or services at a reservation price, and the demand for the goods or services is weak, the purchaser will be able purchase the goods or services at the reservation price at the future time if the purchaser so desires. If demand for the goods or services is strong, and the purchaser may be required to purchase the goods or services at a higher price than the reservation price if the purchaser still desires to actually purchase the goods or services.

In one embodiment of the present invention, an electronic option fee may be determined, in part, by electronic option terms input by a purchaser. A individual supplier may also provide different types of electronic options to different individual users based on their current or previous interactions.

In another embodiment of the present invention, the electronic option is a "personalized electronic coupon" dynamically created by a server network device and sent to a client network device based on current or previous input from a user. In such an embodiment, a purchaser of the option may also input one or more desired options terms to create his/her own personalized electronic coupon. The personalized electronic coupon is governed by the electronic options terms determined by a desired supplier and/or by the purchaser.

A electronic option is sold for an option fee that is typically set as a small percentage of the reserved purchase price (e.g., 1% to 25%). A purchaser is risking a small amount of money to potentially purchase desired goods or services at a reservation price at a desired future time. The reservation price is typically lower than a regular price charged for the goods and services.

However, the electronic option does not obligate a purchaser to actually purchase the desired goods or services for the reservation price at the desired future time. A purchaser may choose not to exercise the electronic option. As a result, the purchaser only loses a small amount of money that was paid to buy the electronic option (i.e., the option fee). The supplier may make a small amount of money from each electronic option that was not exercised and is typically able to sell the optioned goods or services to other purchasers.

In one specific embodiment of the present invention, the option fee may be determined by one or more of the electronic option factors illustrated in Table 1. However, the present invention is not limited to an electronic option using the electronic option factors illustrated in Table 1, and equivalent or other types of electronic options factors can also be used.

TABLE 1

| Electronic Option Factor | Description |
| --- | --- |
| S | A factor relating to a selected strike price (i.e., a price at which an optioned good or service may be purchased). |
| D | A factor relating to a selected time period an option is valid for (i.e., a number of days) |
| V | A factor relating to a standard deviation in an average price volatility of a good or service. |
| L | A factor relating to a list price of the product. |
| BE | A factor relating to a distributor's break even point of a good or service. |
| LAP | A factor relating to a lowest available sales price for the good or service that can be obtained with comparison shopping. |
| NR | A factor relating to a possible non-availability of the good or service upon option exercise. |
| DIS | A factor relating to a discounting toward a break even point |

In one embodiment of the present invention, determining an option fee for an electronic option is illustrated with Equations 1, 2 and 3 using the electronic option factors from Table 1. However, the present invention is not limited to calculation of an option fee as is illustrated in Equations 1, 2 and 3 and other or equivalent option formulas may be used to calculate the option fee. In addition, Equations 1, 2 and 3 may be combined into one equation, or further split into additional equations, and the present invention is not limited to calculating an option fee for an electronic option using three equations.

$$(LAP*(1+V)-S)=A \quad (1)$$

$$A-(DIS*(LAP*(1+V)-BE))=\text{SUM} \quad (2)$$

$$(\text{SUM}+(NR*S))*(D/365+1)=\text{ELECTRONIC OPTION FEE} \quad (3)$$

For example, suppose a user desired to purchase an electronic option for a 60 day time period on a Digital Video Disk ("DVD") player with a list price of $200 and a reservation price of $170. Table 2 illustrates exemplary values for electronic option factors from Table 1 used to determine an exemplary electronic option fee charged at Step 32 by a supplier. Table 3 illustrates the use of the electronic option factors from Table 2 in Equations 1, 2 and 3.

TABLE 2

| Electronic Option Factor | Description |
| --- | --- |
| S | $170 |
| D | 60 |
| V | 0.05 |
| L | $200 |
| BE | $160 |
| LAP | $180 |
| NR | 0.01 |
| DIS | 0.5 |

TABLE 3

| | |
| --- | --- |
| $180 * (1 + 0.05) − $170 = $19.00 | (1) |
| $19.00 − (0.5 * ($189 − $160)) = $4.50 | (2) |
| ($4.50 + (0.01* $170)) * (60/365 + 1) = $7.22 | (3) |

As is illustrated in Table 3, a purchaser would pay $7.22 option fee for an electronic option to buy a DVD player within 60 days. The electronic option gives the purchaser a right to pay a total price of $177.22 ($170+$7.22) for the DVD player that sells for a list price of $200, if the electronic option is exercised. Otherwise, the purchaser risked only $7.22 for 60 days to potentially "reserve" a DVD player for purchase. This example assumes that the lowest possible price a purchaser could find the DVD player anywhere else by comparison shopping would be $180 (i.e., the LAP price), if the DVD player was available from a supplier when the purchaser desired the DVD player. Thus, the purchaser can actually reserved the DVD player, guarantee the DVD player would be available for 60 days, and save $2.78 for the lowest available offered price for the DVD layer ($180−177.22) with wasting time shopping for a lower price.

The option fee is set by a supplier to make the electronic options attractive to a purchaser, and help convince a purchaser that it is not necessary to spend any of his or her own time to try and find a lower price for desired goods or services.

In one embodiment of the present invention, all of the option fee is paid to an electronic option service that provided the electronic option information. In another embodiment of the present invention, a first portion of the option fee is paid to an electronic option service that provided the electronic information. A second portion of the option fee is paid to the desired supplier who can provide the desired good or service. For example, for an option fee of $7.22, the option service may collect $0.22 and the desired supplier may collect $7.00. The option service collects a small fee for each electronic option purchased for providing the electronic option service. The desired supplier collects a larger fee for taking the risk to potentially supply the desired good or service. In another embodiment of the present invention, all of the option fee is paid to the desired supplier who can provide the desired good or service.

In another embodiment of the present invention, an option service may be paid a small percentage of the option fee as well as a percentage of a purchase price for every good or service that is actually purchased by exercising an electronic option. For example, a option service may be paid 5% of the option fee as well as 2% of the actual purchase price of the good or service. In another embodiment of the present invention, all of the option fee may be paid to a supplier, while the option service may be paid only a percentage of a purchase price for an exercise electronic option on a good or service.

These embodiments are illustrative only. Virtually any type of option fee or purchase price sharing can be used with the present invention.

Figure 3:
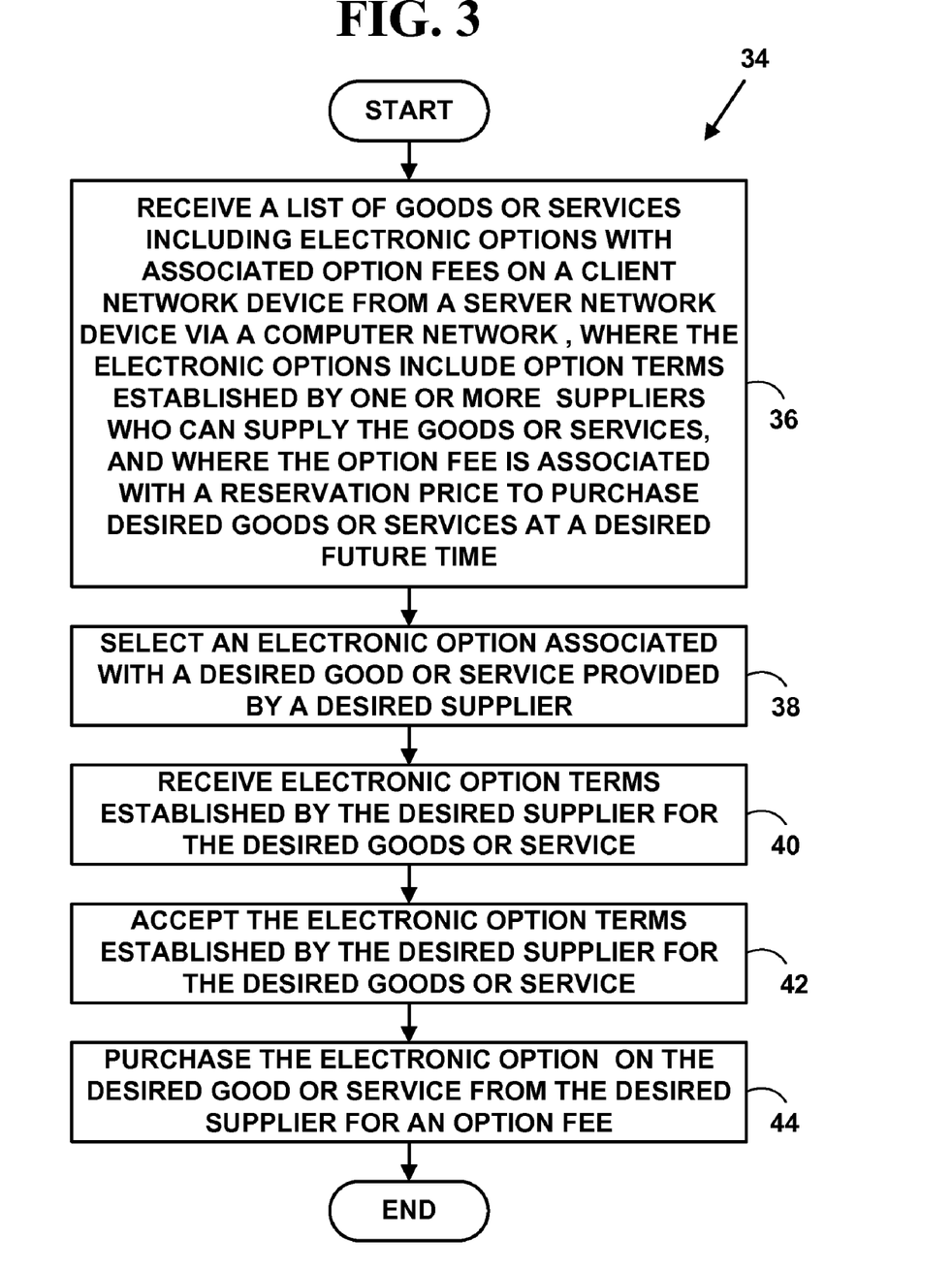
FIG. 3 is a flow diagram illustrating a method for requesting electronic options for goods and services from a client network device.

Requesting Electronic Options for Goods and Services From a Client Network Device FIG. 3 is a flow diagram illustrating a Method 34 for requesting electronic options for goods and services from a client network device. At Step 36, a list of available goods or services including plural electronic options with associated option fees for the goods or services, is received from a server network device on a client network device via a computer network. The plural electronic options include electronic option terms established by one or more suppliers who can supply the goods or services. An option fee is associated with a reservation price to purchase desired goods or services at a desired future time. At Step 38, an electronic option associated with a desired good or service provided by a desired supplier is selected. At Step 40, electronic option terms established by the desired supplier for the desired good or service are received on the client network device. At Step 42, the electronic option terms for the desired good or service are accepted on the client network device. At Step 44, the electronic option is purchased on the desired good or service provided by the desired supplier based on the accepted electronic option terms established by the desired supplier for an option fee. A confirmation for purchasing the electronic option is received from the server network device on the client network device.

In one embodiment of the present invention, the electronic option terms established by the desired supplier for the desired good or service received on the client network device include a request for a user to enter personal information (e.g., name, address, phone number, e-mail address, etc.) that is used to associate a user with a desired electronic option.

In one embodiment of the present invention, the confirmation includes an indication of the option fee paid for the electronic option, an expiration date for the electronic option, the reservation price and the desired supplier. In another embodiment of the present invention, the confirmation includes the information listed in the previous sentence as well as other information such as the LAP price, etc.

Figure 4A:
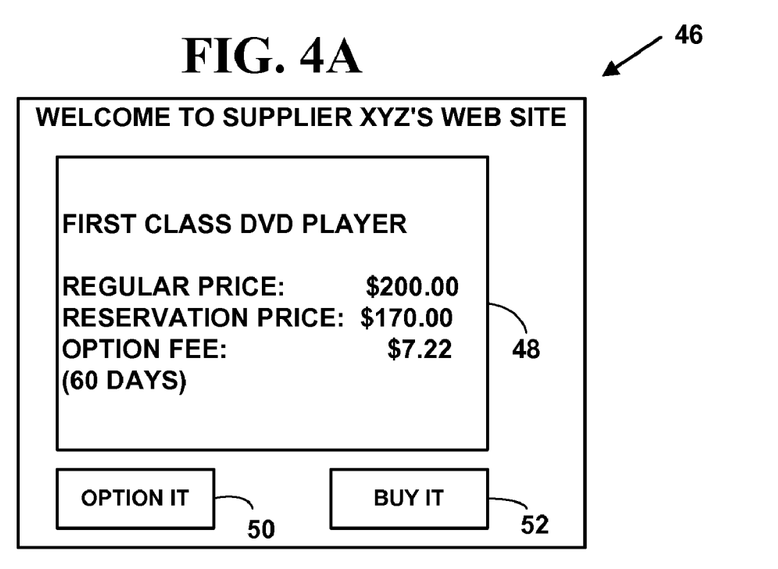
FIGS. 4A, 4B and 4C are block diagrams visually illustrating the methods of FIG. 2 and FIG. 3.
Figure 4B:
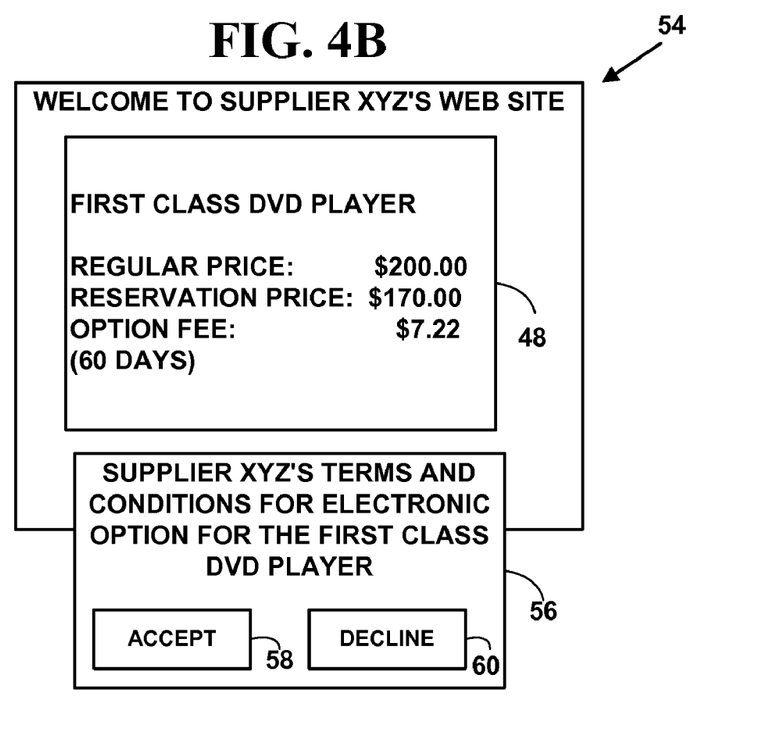
Figure 4C:
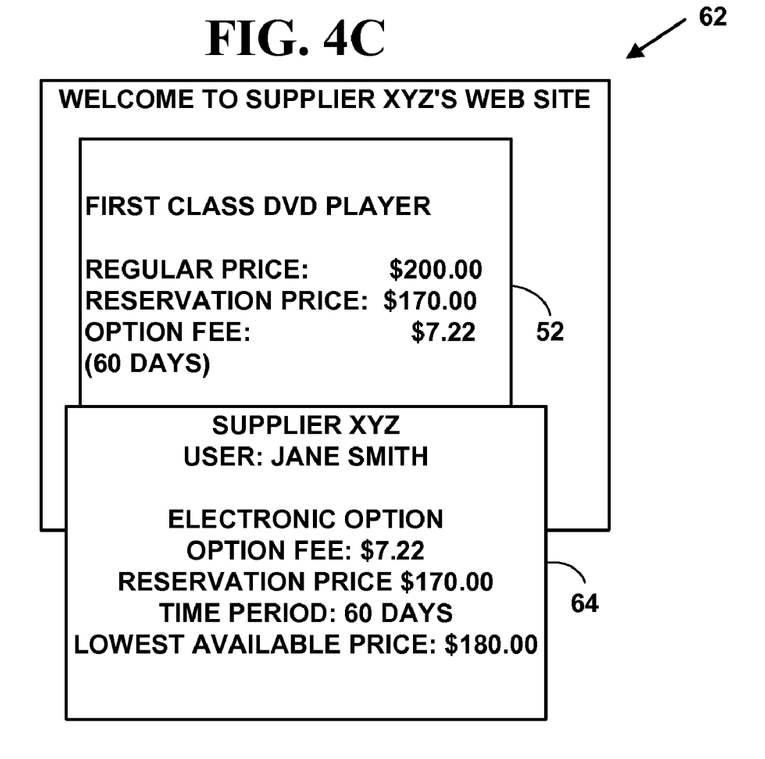

The interaction between Methods 26 and 34 are illustrated with one specific exemplary embodiment of the present invention. However, the present invention is not limited to this specific exemplary embodiment and other embodiments can also be used with Methods 26 and 34. FIGS. 4A, 4B and 4C are block diagrams 46, 54, 62 visually illustrating the interactions between Methods 26 and 34.

In such a specific embodiment of the present invention, at Step 28 (FIG. 2) the server network device 24 provides to a client network device 16 via the Internet 18, a list of available goods and electronic options with associated option fees. At Step 36 (FIG. 3), the client network device 16 receives the list of available goods and electronic options with associated option fees from the server network device 24 via the Internet 18. In this example, FIG. 4A illustrates a list 48 of DVD players currently being offered by Supplier XYZ. The list 48 includes an electronic option with associated option fee for the "First Class" DVD player. The DVD player is currently being sold for $200. An electronic option can be purchased for 60 days for an option fee of $7.22 to allow the DVD player to be purchased at a reservation price of $170.

At Step 38 (FIG. 3) an electronic option associated with the DVD player provided by Supplier XYZ is selected from the client network device 16. In this example, the electronic option is selected by selecting the "OPTION IT" button 50 (FIG. 4A). However, the present invention is not limited to selecting an electronic option with this method and other methods can also be used. The DVD player can also be purchased directly for $200 by selecting the "BUY IT" button 52 (FIG. 4C).

At Step 30 (FIG. 2) electronic option terms 56 (FIG. 4B) for the selected First Class DVD player from the Supplier XZY are provided from the server network device 24 to the client network device 16. At Step 40 (FIG. 3), the electronic option terms 56 (FIG. 4B) are received on the client network device 16. At Step 42 (FIG. 3), the electronic option terms 60 for the DVD player are accepted on the client network device 16. In this example, the electronic option terms are accepted by selecting the "ACCEPT" button 58 (FIG. 4B). However, the present invention is not limited to selecting electronic option terms with this method and other methods can also be used. A user can also decline to accept the electronic option terms by selecting the "DECLINE" button 60 (FIG. 4B). If a user declines to accept the electronic option terms provided by the Supplier XYZ, the electronic option can not be purchased.

At Step 44 (FIG. 3), the electronic option is purchased on the DVD player based on the accepted electronic option terms 56 established by Supplier XYZ for an option fee of $7.22. The reservation price for the DVD player is $170. At Step 32 (FIG. 2) the electronic option purchased for the DVD played accepted on the server network device 24 according to electronic option terms established by the Supplier XYZ. The electronic option information is stored in a database associated with the server network device 24.

A confirmation for purchase of the electronic option for the option fee is provided to the client network device 16 from the server network device 24. A confirmation 64 (FIG. 4C) for purchasing the electronic option is received from the server network device 24 on the client network device 16. In this example, the confirmation 64 (FIG. 4C) includes an indication of the supplier (Supplier XYZ), user (Jane Smith), option fee paid ($7.22), reservation price ($170), time period (60 days) and current LAP price ($180). However, the present invention is not limited to a confirmation with this information, and more, fewer or equivalent confirmation information items can also be used.

In one embodiment of the present invention, a user who purchases an electronic option can access electronic option information from a client network device via the computer network 18. In such an embodiment, a user would be provided a method to securely obtain electronic option information (e.g., a login and password, etc.). In one embodiment of the present invention, a central server network device is used to store electronic option information for all suppliers.

In another embodiment of the present invention, electronic option information is stored on one or more server network devices for individual suppliers who provide the desired goods or services for which the electronic option was purchased. In another embodiment of the present invention, the electronic option information can be obtained from both a central server network device as well as from the one or more server network devices for individual suppliers who provide the desired goods or services for which the electronic option was purchased.

Figure 5:
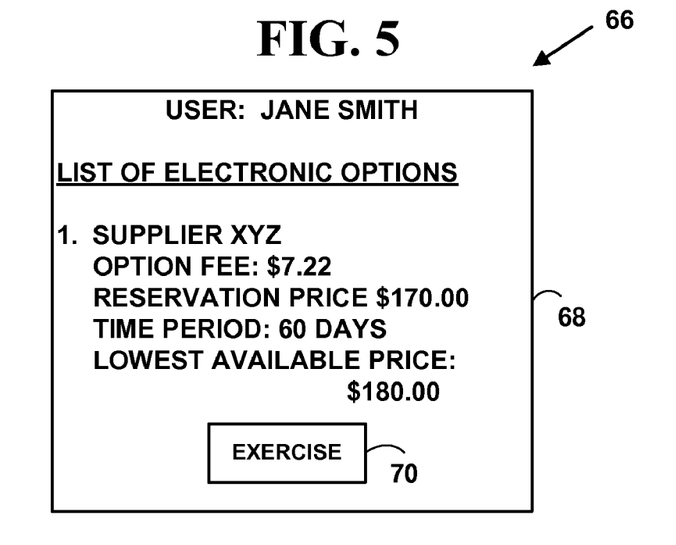
FIG. 5 is a block diagram illustrating exemplary electronic option confirmation information for the electronic option of FIG. 4C.

FIG. 5 is a block diagram 66 illustrating exemplary electronic option information 64 for the electronic option of FIG. 4C. In this example, the electronic option information includes an "EXERCISE" button 70 that allows a user to immediately exercise the electronic option and obtain the DVD player for a reservation price of $170. Since the electronic option information is provided electronically (i.e., via a computer network), when a user selects the EXERCISE button 70, the desired good may then be automatically shipped directly the purchaser without further input from the purchaser.

In one embodiment of the present invention, Method 34 can be used by purchase managers to proactively reserve goods or services that will be needed at a future time for a known reservation price. Method 34 not only provides a method to aid future planning for resources and/or budgets, but also provides a method to allow non-executive staff to efficiently assist executive staff in a business organization. For example, if a manufacturer knows that it typically must purchase four machine presses per year because of normal wear and tear, a purchase manager could purchase four electronic options on the presses in January or each year. Thus, the purchase manager has effectively authorized the purchase of four presses at the reservation price.

When a press breaks down and needs to be replaced, an electronic option for a press could be exercised at the reservation price. Since the purchase manager has purchased the electronic options for a pre-determined reservation price, a low-level assistant could actually exercise the electronic option and obtain the press without input from the purchase manager.

Use of Electronic Option Information by Desired Suppliers

Figure 6:
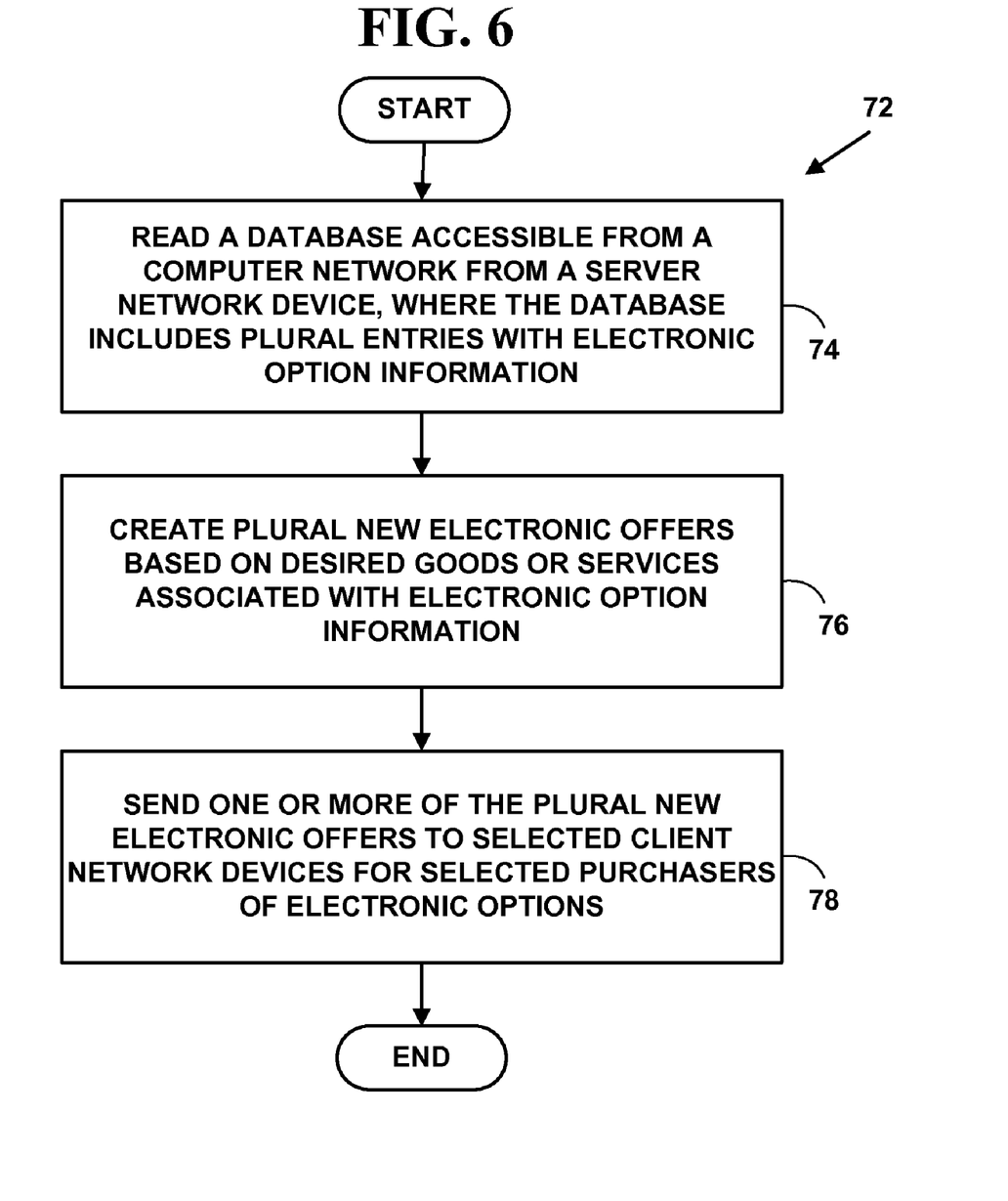
FIG. 6 is a flow diagram illustrating a method for using electronic options by desired supplier.

FIG. 6 is a flow diagram illustrating a Method 72 for using electronic options by a desired supplier. At Step 74, a database accessible from a computer network is read from a server network device. The database includes plural entries with electronic option information. At Step 76, plural new electronic offers are created based on desired goods or services associated with the electronic option information. At Step 78, one or more of the plural new electronic offers are sent to selected client network devices for selected purchasers of electronic options.

Method 72 allows a desired supplier who was willing to accept an electronic option for a desired good or service to try and sell other items to a purchaser of an electronic option. For example, if a purchaser had purchased an electronic option on a DVD player from a desired supplier, the desired supplier may send the purchaser offers to buy DVD disks for the DVD player. Method 72 may also allow a desired supplier to alert a purchaser of sale items. Method 72 may also allow a desired supplier to coax a purchaser to exercise an electronic option by sending offers to remind the purchaser to purchase the desired good or service at the reservation price or a price below the reservation price. Method 72 may help a desired supplier better manage inventories of goods or better manage services.

Use of Electronic Option Information by Other Suppliers

Figure 7:
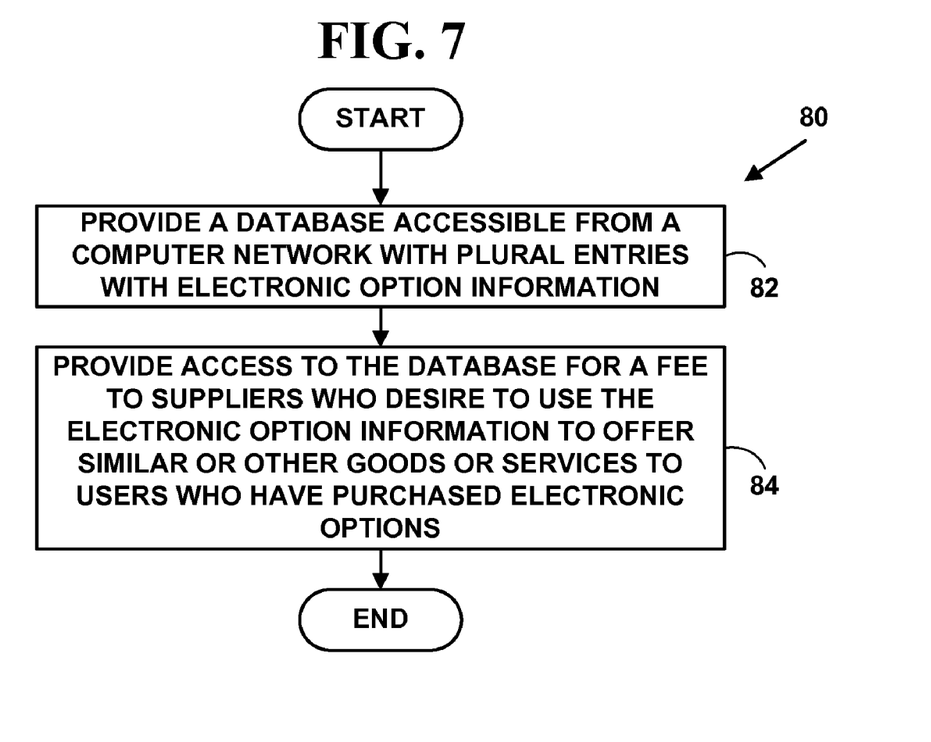
FIG. 7 is a flow diagram illustrating a method for using electronic options by other suppliers.

FIG. 7 is a flow diagram illustrating a Method 80 for using electronic options by other suppliers. At Step 82, a database accessible from a computer network including a plurality of entries with electronic option information is provided. At Step 84, access to the database is provided for a fee to suppliers who desire to use the electronic option information to offer similar or other goods or services to users who have purchased electronic options.

Method 80 allows other suppliers to target purchasers of electronic options with information about similar goods or services or different types of goods and services offered by a supplier. As was discussed above the electronic options may be made available to other suppliers only if the purchaser gives his/her permission. However, the electronic options may also be made available to other suppliers based on the option terms set by a supplier, and agreed to by a purchaser.

The methods and system described herein may be used for to provide options for b2b, b2c, c2b, c2c or other types of transactions over the Internet. However, the present invention is not limited to these transactions and other types of transactions can also be used.

The methods and systems described herein may offer the following advantages for suppliers: (1) a supplier may make additional revenue from electronic option fees even if an electronic option is not exercised by a purchaser; (2) a supplier is in complete control of the electronic option terms; (3) a supplier may be able convert browsers into purchasers by allowing a browser to risk a small amount of money for the ability to reserve a purchase of a desired good or service with an electronic option; and (4) a supplier can use demographic information collected from a user and associated with an electronic option to cross-sell additional goods or services.

The methods and system described herein may offer the following advantages for purchasers: (1) a purchaser can use an option to lock in a lower price for an item that may be in high demand; (2) a purchaser can use the reservation price from a computer network supplier to comparison shop at "brick and mortar" suppliers; (3) a purchaser can reserve a purchase of a good or service for a gift for an occasion that is months into the future and take actual delivery just before the occasion; and (4) a purchaser can risk a small amount of money to reserve the right to purchase a good or service in the future, but not be obligated to actually purchase the good or service.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments including hardware or firmware implementations, or combinations thereof, may alternatively be used, and visa versa.

The claims should not be read as limited to the described order or elements unless stated to that effect. Therefore, all embodiments that come within the scope and spirit of the following claims and equivalents thereto are claimed as the invention.

We claim:

1. A method for using electronic options for goods or services or events, comprising:

reading a plurality of entries from a database accessible from a computer network from a server network device with one or more processors, wherein the plurality of entries include electronic option information, wherein the electronic option information includes a plurality of electronic options supplied and governed by one or more different suppliers, wherein the plurality of electronic options are not supplied or governed via a central government agency and are not supplied or governed via security laws and wherein the electronic option information further includes a plurality of different electronic option terms for the plurality of different suppliers, wherein the electronic option terms for a desired supplier are unique to the desired supplier;

creating on the server network device a plurality of new electronic offers based on desired goods or services or events associated with the electronic option information, wherein the plurality of new electronic offers include a plurality of reservation prices and a plurality of associated option fees, wherein an option fee is not part of a reservation price paid to purchase desired goods or services or events at a desired future time and wherein selected ones of the plurality of electronic options include electronic options for goods or services that do not currently exist and may never exist and other selected ones of the plurality of electronic options include electronic options for a sporting event or entertainment event that may or may never happen;

sending from the server network device one or more of the created plurality of new electronic offers to selected client network devices each with one or more processors via the computer network for viewing by selected potential purchasers of electronic options;

accepting purchases of electronic options for option fees for desired goods or services or events for one or more desired suppliers on the server network device from one or more selected client network devices, wherein the purchase of the electronic option is accepted according to electronic option terms established by the desired suppliers providing the electronic option and wherein the purchased electronic options are also used to manage inventory, risk, revenues or budgets of the one or more different suppliers;

sending periodic electronic reminders or additional electronic offers from the server network device to one or more selected client network devices, wherein the periodic electronic reminders include reminders to coax a purchaser to exercise a purchased electronic option to purchase the desired good or service or event at the reservation price or a price below the reservation price and wherein the additional electronic offers also include sale items that may be purchased instead of the desired goods or services or events reserved with the purchased electronic options; and allowing a purchaser of an electronic option to exercise the electronic option on the server network device at any time before the desired future time to purchase the desired goods or services or event at the reservation price, at the desired future time to purchase the desired goods or services at the reservation price, at a price lower than the reservation price or at a price higher than the reservation price or to not exercise the electronic option at all and not purchase the desired goods or services at all.

2. The method of claim 1 further comprising:

allowing the plurality of reservation prices for goods or service or events to be used from the selected client network devices to comparison shop purchases prices for goods or services or events at other brick and mortar suppliers of goods or services or events that do not provide electronic options via the server network device.

3. The method of claim 1 further comprising:

displaying from the server network device via the computer network to selected client network devices an interface with a plurality of different buttons including:

(1) an, Option It button, for purchasing an electronic option for a desired good or service or event provided by a specific supplier;

(2) a, Buy It button, for buying a desired good or service or event provided by the specific supplier;

(3) an, Accept button, for accepting electronic option terms for a desired good or service or event provided by the specific supplier;

(4) a, Decline button, for declining electronic option terms for a desired good or service or event provided by the specific supplier; and (5) an, Exercise button, for exercising at a reservation price an electronic option purchased for a desired good or service or event provided by the specific supplier; and displaying on the interface a list of electronic options purchased by a specific purchaser via a specific client network device.

4. A method for using electronic options for goods or services or events, comprising:

reading a plurality of entries from a database accessible from a computer network from a server network device with one or more processors, wherein the plurality of entries include electronic option information, wherein the electronic option information includes a plurality of electronic options supplied and governed by one or more different suppliers, wherein the plurality of electronic options are not supplied or governed via a central government agency and are not supplied or governed via security laws and wherein the electronic option information further includes a plurality of different electronic option terms for the plurality of different suppliers, wherein the electronic option terms for a desired supplier are unique to the desired supplier;

creating on the server network device a plurality of new electronic offers based on desired goods or services or events associated with the electronic option information, wherein the plurality of new electronic offers include a plurality of reservation prices and a plurality of associated option fees, wherein an option fee is not part of a reservation price paid to purchase desired goods or services or events at a desired future time and wherein selected ones of the plurality of electronic options include electronic options for goods or services that do not currently exist and may never exist and other selected ones of the plurality of electronic options include electronic options for a sporting event or entertainment event that may or may never happen;

sending from the server network device one or more of the created plurality of new electronic offers to selected client network devices each with one or more processors via the computer network for viewing by selected potential purchasers of electronic options;

collecting demographic information from selected client network devices who view the plurality of new electronic offers, wherein the demographic information is used to present other electronic offers to attempt to cross-sell additional goods or services or events to the selected client network devices;

storing from the server network device the collected demographic information in the database associated with the sever network device;

accepting purchases of electronic options for option fees for desired goods or services or events for one or more desired suppliers on the server network device from one or more selected client network devices, wherein the purchase of the electronic option is accepted according to electronic option terms established by the desired suppliers providing the electronic option and wherein the purchased electronic options are also used to manage inventory, risk, revenues or budgets of the one or more different suppliers; and allowing a purchaser of an electronic option to exercise the electronic option on the server network device at any time before the desired future time to purchase the desired goods or services at the reservation price, at the desired future time to purchase the desired goods or services at the reservation price, at a price lower than the reservation price or at a price higher than the reservation price or to not exercise the electronic option at all and not purchase the desired goods or services at all.

5. The method of claim 4 further comprising:

providing access to the database from the server network device from the computer network for a pre-determined fee to additional suppliers of goods or services or events who desire to use the collected demographic information to offer similar or other goods or services or events to purchasers of electronic options; and allowing the additional suppliers of goods or services or events to target purchasers of electronic options with information about similar goods or services or events or different types of goods or services and events offered by the additional suppliers using the collected demographic information in the database.

6. The method of claim 5 wherein the additional suppliers include:

additional business-to-business (b2b), business-to-consumer (b2c), consumer-to-business (c2b) or consumer-to-consumer (c2c) suppliers of goods or services or events.

7. A method for using electronic options for goods or services or events, comprising:

reading a plurality of entries from a database accessible from a computer network from a server network device with one or more processors providing an electronic option service, wherein the plurality of entries include electronic option information, wherein the electronic option information includes a plurality of electronic options supplied and governed by one or more different suppliers, wherein the plurality of electronic options are not supplied or governed via a central government agency and are not supplied or governed via security laws and wherein the electronic option information further includes a plurality of different electronic option terms for the plurality of different suppliers, wherein the electronic option terms for a desired supplier are unique to the desired supplier;

creating on the server network device a plurality of new electronic offers based on desired goods or services or events associated with the electronic option information, wherein the plurality of new electronic offers include a plurality of reservation prices and a plurality of associated option fees, wherein an option fee is not part of a reservation price paid to purchase desired goods or services or events at a desired future time and wherein selected ones of the plurality of electronic options include electronic options for goods or services that do not currently exist and may never exist and other selected ones of the plurality of electronic options include electronic options for a sporting event or entertainment event that may or may never happen;

sending from the server network device one or more of the created plurality of new electronic offers to selected client network devices each with one or more processors via the computer network for viewing by selected potential purchasers of electronic options;

collecting demographic information from selected client network devices who view the plurality of new electronic offers, wherein the demographic information is used to present other electronic offers to attempt to cross-sell additional goods or services to the selected client network devices;

storing from the server network device the collected demographic information in the database associated with the sever network device;

providing access to the database from the server network device from the computer network for a pre-determined fee to other suppliers of goods or services or events who desire to use the electronic option information to offer similar or other goods or services or events to purchaser of electronic options;

accepting purchases of electronic options for option fees for desired goods or services or events for one or more desired suppliers on the server network device from one or more selected client network devices, wherein the purchase of the electronic option is accepted according to electronic option terms established by the desired suppliers providing the electronic option and wherein the purchased electronic options are also used to manage inventory, risk, revenues or budgets of the one or more different suppliers;

collecting on the server network device for the electronic option service a first set of fees from the one or more different suppliers for creating and sending the created plurality of new electronic offers including the plurality of electronic options offered by the one or more different suppliers to the selected client network devices;

collecting on the server network device for the electronic option service a second set of fees from a portion of the electronic option fees collected for electronic options purchased but not exercised by purchasers of the electronic options;

collecting on the server network device for the electronic option service a third set of fees from a portion of the electronic option fees collected for electronic options purchased and exercised by purchasers of the electronic options and from portion of a final purchase price of goods or services or events actually purchased by purchasers using the exercised electronic options; and collecting on the server network device for the electronic option service a fourth set of fees including the pre-determined fees paid by selected ones of the other suppliers who access the database including the collected demographic information.

8. A system for using electronic options for goods or services or events, comprising in combination:

a non-transitory computer readable medium on a server network device with one or more processors including a plurality of instructions:

for reading a plurality of entries from a database accessible from a computer network from the server network device with one or more processors, wherein the plurality of entries include electronic option information, wherein the electronic option information includes a plurality of electronic options supplied and governed by one or more different suppliers, wherein the plurality of electronic options are not supplied or governed via a central government agency and are not supplied or governed via security laws and wherein the electronic option information further includes a plurality of different electronic option terms for the plurality of different suppliers, wherein the electronic option terms for a desired supplier are unique to the desired supplier;

for creating on the server network device a plurality of new electronic offers based on desired goods or services or events associated with the electronic option information, wherein the plurality of new electronic offers include a plurality of reservation prices and a plurality of associated option fees, wherein an option fee is not part of a reservation price paid to purchase desired goods or services or events at a desired future time and wherein selected ones of the plurality of electronic options include electronic options for goods or services that do not currently exist and may never exist and other selected ones of the plurality of electronic options include electronic options for a sporting event or entertainment event that may or may never happen;

for sending from the server network device one or more of the created plurality of new electronic offers to selected client network devices each with one or more processors via the computer network for viewing by selected potential purchasers of electronic options;

for accepting purchases of electronic options for option fees for desired goods or services or events for one or more desired suppliers on the server network device from one or more selected client network devices, wherein the purchase of the electronic option is accepted according to electronic option terms established by the desired suppliers providing the electronic option and wherein the purchased electronic options are also used to manage inventory, risk, revenues or budgets of the one or more different suppliers;

for sending periodic electronic reminders or additional electronic offers from the server network device to one or more selected client network devices, wherein the periodic electronic reminders include reminders to coax a purchaser to exercise a purchased electronic option to purchase the desired good or service or event at the reservation price or a price below the reservation price and wherein the additional electronic offers also include sale items that may be purchased instead of the desired goods or services or events reserved with the purchased electronic options;

for allowing a purchaser of an electronic option to exercise the electronic option on the server network device at any time before the desired future time to purchase the desired goods or services or event at the reservation price, at the desired future time to purchase the desired goods or services at the reservation price, at a price lower than the reservation price or at a price higher than the reservation price or to not exercise the electronic option at all and not purchase the desired goods or services at all;

for allowing the plurality of reservation prices for goods or service or events to be used from the selected client network devices to comparison shop purchases prices for goods or services or events at other brick and mortar suppliers of goods or services or events that do not provide electronic options via the server network device;

for providing access to the database from the server network device from the computer network for a pre-determined fee to additional suppliers of goods or services or events who desire to use the collected demographic information to offer similar or other goods or services or events to purchasers of electronic options;

for allowing the additional suppliers of goods or services or events to target purchasers of electronic options with information about similar goods or services or events or different types of goods or services and events offered by the additional suppliers using the collected demographic information in the database;

for collecting on the server network device for a first set of fees from the one or more different suppliers for creating and sending the created plurality of new electronic offers including the plurality of electronic options offered by the one or more different suppliers to the selected client network devices;

for collecting on the server network device a second set of fees from a portion of the electronic option fees collected for electronic options purchased but not exercised by purchasers of the electronic options;

for collecting on the server network device a third set of fees from a portion of the electronic option fees collected for electronic options purchased and exercised by purchasers of the electronic options and from portion of a final purchase price of goods or services or events actually purchased by purchasers using the exercised electronic options;

for collecting on the server network device a fourth set of fees including the pre-determined fees paid by selected ones of the other suppliers who access the database including the collected demographic information;

for displaying from the server network device via the computer network to selected client network devices an interface with a plurality of different buttons including:

(1) an Option It button, for purchasing an electronic option for a desired good or service or event provided by a specific supplier;

(2) a Buy It button, for buying a desired good or service or event provided by the specific supplier at an advertised purchased price;

(3) an Accept button, for accepting electronic option terms for a desired good or service or event provided by the specific supplier;

(4) a Decline button, for declining electronic option terms for a desired good or service or event provided by the specific supplier; and (5) an Exercise button, for exercising an electronic option at a reservation price purchased for a desired good or service or event provided by the specific supplier; and for displaying on the interface a list of electronic options purchased by a specific purchaser with a specific client network device.

* * * * *